United States Patent [19]

Mazur et al.

[11] 4,226,169

[45] Oct. 7, 1980

[54] ADJUSTABLE EXPANDABLE CRYOGENIC PISTON AND RING

[75] Inventors: Peter O. Mazur, Aurora; Carl B. Pallaver, Woodridge, both of Ill.

[73] Assignee: The United States of America as represented by the United States Department of Energy, Washington, D.C.

[21] Appl. No.: 912,784

[22] Filed: Jun. 5, 1978

[51] Int. Cl.³ .............................. F16J 1/06; F16J 9/10
[52] U.S. Cl. ...................................... 92/206; 92/205
[58] Field of Search ................. 92/86, 206, 207, 201, 92/205, 193

[56] References Cited

U.S. PATENT DOCUMENTS

| | | | |
|---|---|---|---|
| 125,857 | 4/1872 | Teal | 92/201 |
| 1,468,459 | 9/1923 | Deakins et al. | 92/207 X |
| 1,495,286 | 5/1924 | Williams | 92/206 X |
| 1,558,749 | 10/1925 | Mueller | 92/206 X |
| 1,740,931 | 12/1929 | McMahon | 92/206 |
| 2,365,237 | 12/1944 | Allen, Jr. | 92/86 X |
| 2,496,260 | 2/1950 | Baldwin | 92/193 X |
| 2,847,262 | 8/1958 | Gratzmuller | 92/193 |
| 3,037,830 | 6/1962 | Junod | 92/206 X |
| 3,632,235 | 1/1972 | Grenci | 417/901 X |
| 4,087,988 | 5/1978 | Pallaver et al. | 62/514 JT |

FOREIGN PATENT DOCUMENTS 711128  6/1931  France ................................ 92/206

Primary Examiner—Irwin C. Cohen
Attorney, Agent, or Firm—James E. Denny; Frank H. Jackson; Donald P. Reynolds

[57] ABSTRACT

The operation of a reciprocating expansion engine for cryogenic refrigeration is improved by changing the pistons and rings so that the piston can be operated from outside the engine to vary the groove in which the piston ring is located. This causes the ring, which is of a flexible material, to be squeezed so that its contact with the wall is subject to external control. This control may be made manually or it may be made automatically in response to instruments that sense the amount of blow-by of the cryogenic fluid and adjust for an optimum blow-by.

2 Claims, 5 Drawing Figures

ADJUSTABLE EXPANDABLE CRYOGENIC PISTON AND RING

CONTRACTUAL ORIGIN OF THE INVENTION

The invention described herein was made in the course of, or under, a contract with the UNITED STATES DEPARTMENT OF ENERGY.

CROSS REFERENCES TO RELATED APPLICATIONS

This invention is an improvement on the cryogenic refrigeration system described in U.S. patent application Ser. No. 740,330, filed Nov. 9, 1976, now U.S. Pat. No. 4,087,988.

BACKGROUND OF THE INVENTION

This invention relates to reciprocating expansion engines for cryogenic refrigeration. In particular, this invention is useful as an improvement in an existing cryogenic piston refrigeration system that is the subject of U.S. patent application Ser. No. 740,330, allowed but not issued as of the present date. The reciprocating expansion engine that is the subject of that patent application is adaptable for use either as part of a refrigerator or as part if a liquifier in cryogenic applications, depending upon the mode of operation. In either case, the operating parts are exposed to temperature extremes when the working fluid is one such as helium which must be handled at temperatures of the order of a few K. The refrigerator or liquefier disclosed in U.S. application Ser. No. 740,330 worked as an expander for a cryogenic refrigerator or liquefier, but it required a considerable amount of effort to find an optimum sealing arrangement for the pistons. In order to maximize the efficiency of an expander, it is necessary to minimize both blow-by and friction heating of the piston ring. Excessive tightness of the piston ring in the cylinder causes excessive friction heating, while insufficient tightness of the piston ring in the cylinder causes excessive blow-by. It was difficult to achieve a workable seal since no method was provided for controlling tightness of the piston ring in the cylinder. This operation could have been improved by a system making it possible to adjust the sealing to permit an optimum amount of blow-by of the cryogenic fluid, enough to reduce sliding friction without producing excessive loss of efficiency.

It is an object of the present invention to provide a better method of sealing a piston of a reciprocating cryogenic refrigerator or liquefier.

It is a further object of the present invention to provide a means of varying the seal between a piston and a cylinder of a reciprocating cryogenic refrigerator or liquefier while the machine is operating.

It is a further object of the present invention to provide a means of adjusting the seal between the piston and cylinder of a reciprocating cryogenic refrigerator or liquefier in response to a sensor to permit the optimum amount of blow-by of the cryogenic fluid.

Other objects will become apparent in the course of a detailed description of the invention.

SUMMARY OF THE INVENTION

In a reciprocating cryogenic liquefier or refrigerator such as that of U.S. patent application Ser. No. 740,330, operation is improved by modifying the piston and sealing mechanism to make it possible to vary the groove in the piston that holds a sealing ring. Variation of this groove, controlled from an external location while the machine is running, squeezes the sealing ring by an appropriate amount to allow the seal to be varied to an optimum value. Control of the variation may be manual or automatic. While this invention is most useful as an improvement of the cryogenic refrigeration system of Ser. No. 740,330, it will also be useful in improving the operation of any cryogenic piston system, including expanders, pumps, and compressors at all temperatures.

DETAILED DESCRIPTION OF THE INVENTION

Figure 1:
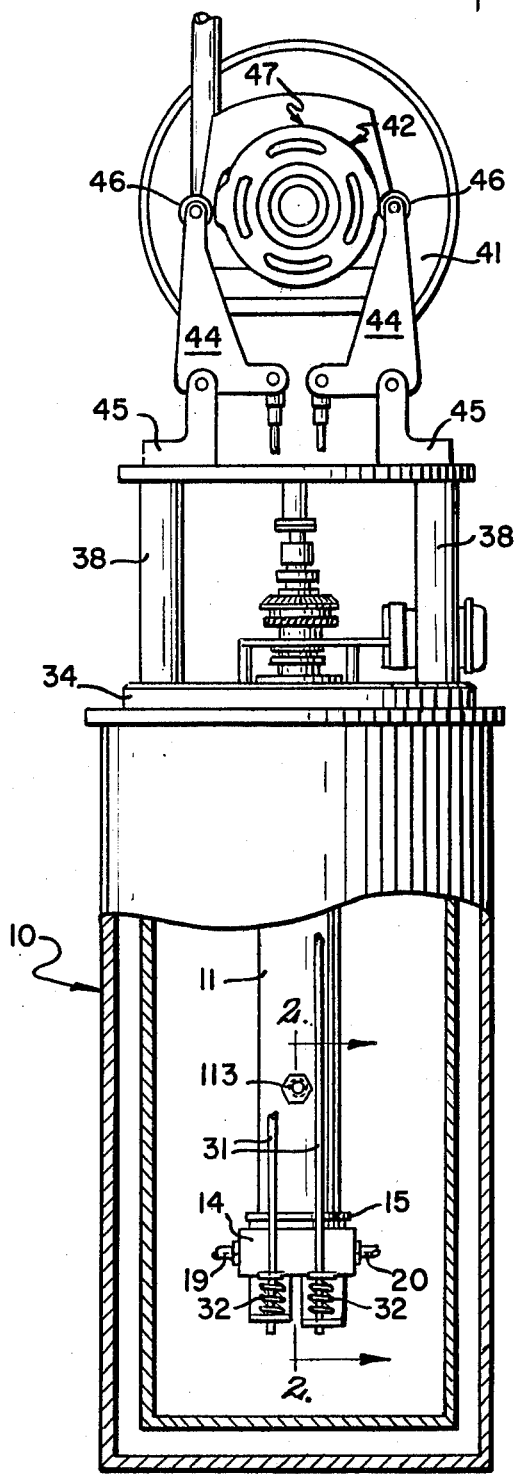
FIG. 1 is a partial sectional elevation of a cryogenic piston expander for a refrigerator or liquefier.

FIG. 1 is a partial sectional elevation of a piston expander of a cryogenic refrigerator or liquefier. The particular apparatus shown in FIG. 1 is essentially that of U.S. patent application Ser. No. 740,330. This apparatus is shown because the present invention has been used as an improvement in that refrigerator and is most easily described as such as improvement. For that purpose, numbers below 100 that refer to elements in all of the figures in the present application are identical to the numbers used in the drawings of U.S. application Ser. No. 740,330. Numbers above 100 are peculiar to the present application. U.S. application Ser. No. 740,330 is incorporated herein by reference as though set forth fully herein. It should, however, be understood that the improvement of the present invention is adaptable to any cryogenic piston expander for a refrigerator or liquefier, to any pump and to any compressor. The term "refrigerator" in that context refers to an apparatus that receives a gas or vapor at a given temperature and produces a gas or vapor at a lower temperature. The term "liquefier" is defined as an apparatus that receives a gas or vapor at a given temperature and produces a liquid at a lower temperature. The term "expander" is defined as a part of a refrigerator or liquefier which accepts gas at a given temperature and pressure and extracts work from it mechanically, producing a gas or liquid at a lower temperature and pressure. The apparatus of FIG. 1 will function either as a part of a refrigerator or of a liquefier, with the operation determined soley by the characteristics of the working fluid and the range of operating temperatures. In normal operation with liquid helium, when a system is cooling down, the apparatus will be run first as a refrigerator to cool gaseous helium in a range above its critical temperature. When the helium has reached its critical temperature and gone somewhat below that temperature, the apparatus may function as a liquefier, producing cooled liquid helium either from warmer liquid helium or from helium that is gaseous and at a higher temperature or may continue to function as a refrigerator at the option of the operator.

Figure 2:
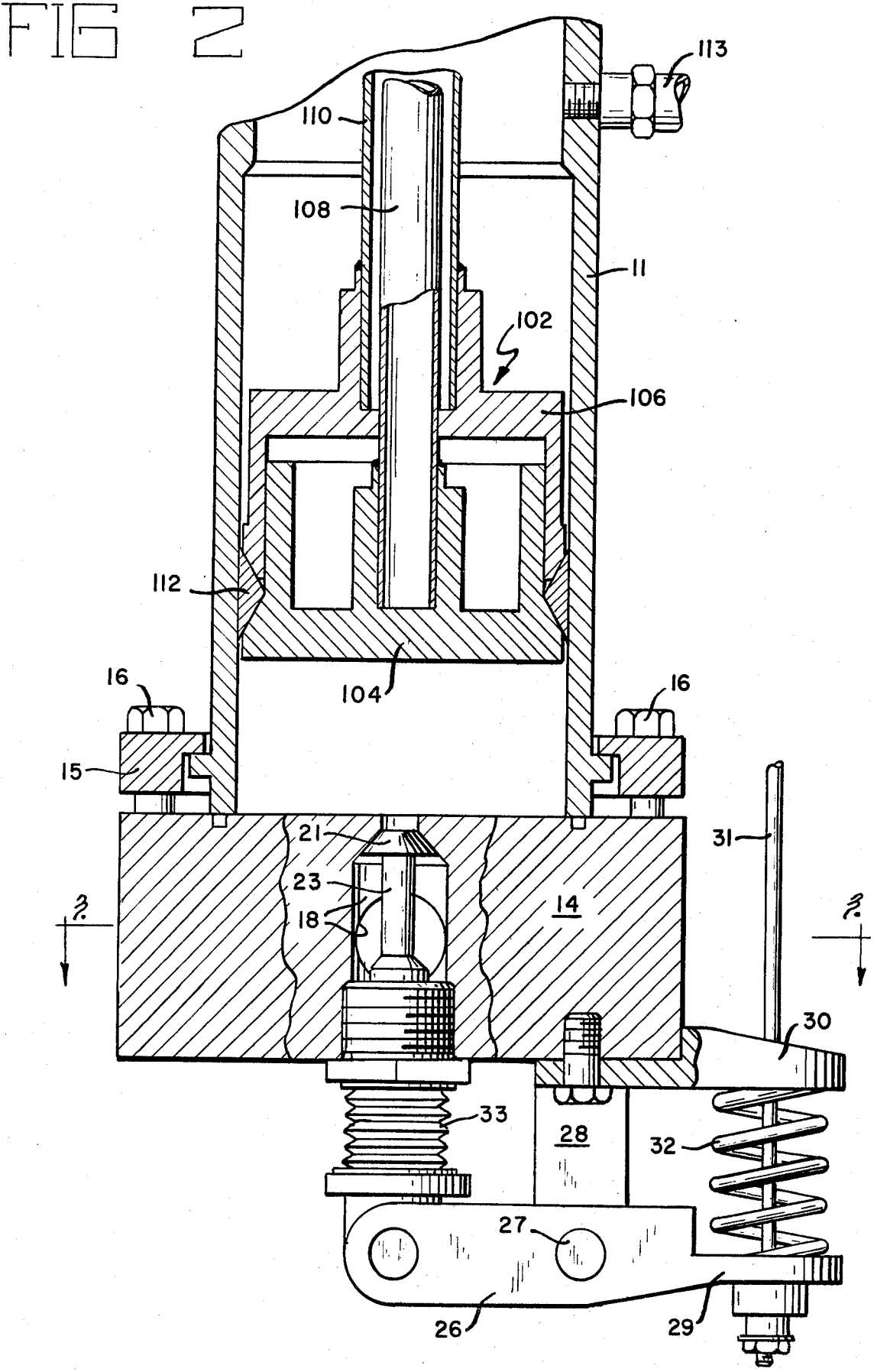
FIG. 2 is a sectional side view of the operating portion of the expander of FIG. 1 taken along section lines 2—2 of FIG. 1.
Figure 3:
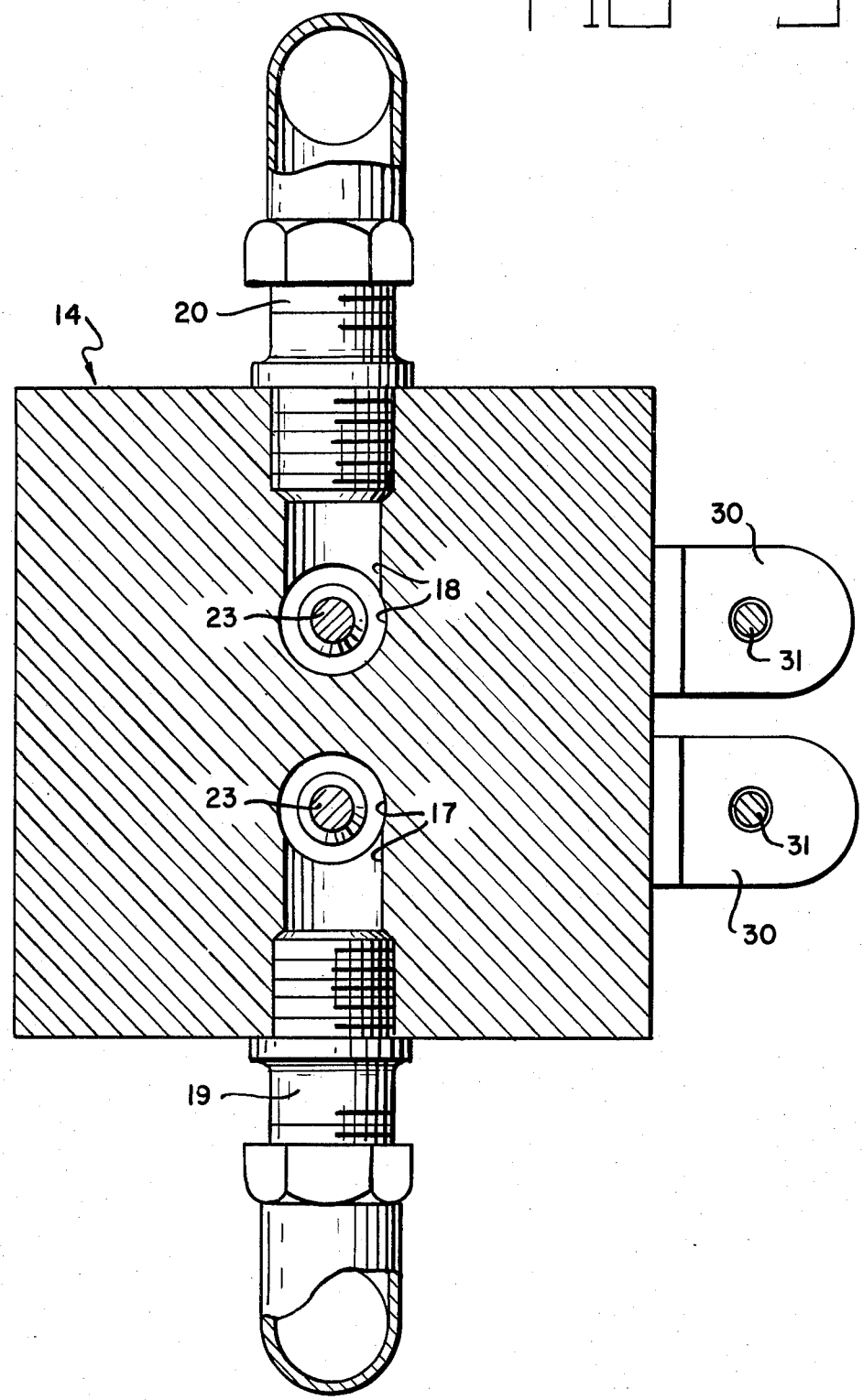
FIG. 3 is a sectional top view of the cylinder head of FIG. 2 taken along section lines 3—3 of FIG. 2.

As stated, FIG. 1 is a partial sectional elevation of the refrigerator and liquefier of U.S. patent application Ser. No. 740,330 as modified for the practice of the present invention. FIG. 2 is a sectional side view of an operating portion of the apparatus of FIG. 1 and FIG. 3 is a sectional top view along section lines 3—3 of FIG. 2. Reviewing briefly the operation of the cryogenic refrigerator or liquefier, Dewar vessel 10 includes a cylinder 11 and a cylinder head 14 that are maintained at a cold temperature by Dewar vessel 10. A piston 102 moves in cylinder 11 and consists of two parts, an inner portion 104 and an outer portion 106. Inner portion 104 is connected to a first rod 108 that is coaxial with second rod 110. Relative motion of first rod 108 with respect to second rod 110 along their common axis causes relative motion of inner portion 104 with respect to outer portion 106. This changes the amount of compression on sealing ring 112 which in turn varies the force exerted by sealing ring 112 on the wall of cylinder 11.

Normal operation of the refrigerator or liquefier is as follows. Liquid or gas at a relatively high pressure enters inlet chamber 17 through inlet line 19. Poppet valve 21 is opened when piston 102 is at a low position. Control of poppet valve 21 is through valve stem 23 which is operated by rocker arm 26. Bracket 28 supports shaft 27 to permit vertical actuating rod 31 to control the motion of rocker arm 26 and hence the operation of poppet valve 21. Spring retainers 29 and 30 hold spring 32 which exerts a force to close poppet valve 21. Bellows seal 33 sustains the pressure in inlet chamber 17 while permitting motion of valve stem 23 with respect to cylinder head 14. To contain the pressure of inlet chamber 17 as applied to cylinder 11 by the opening of poppet valve 21, cylinder 11 is sealed to cylinder head 14 by retainer ring 15 which is held down by bolts 16.

The top view of FIG. 3 shows that a second poppet valve 21 also opens into cylinder 11 to establish a connection between cylinder 11 and outlet chamber 18 which is connected to outlet line 20. A second vertical actuating rod 31 operates this second poppet valve 21 to establish a connection between the interior of cylinder 11 and outlet chamber 18 which is connected in turn to outlet line 20. First rod 108 and second rod 110 serve two functions. Without relative motion between them, they connect piston 102 to flywheel 41 of FIG. 1 through a conventional crank assembly that is not shown. Flywheel 41 serves to provide inertial storage and is also connected to a motor, also not shown, that serves as a speed control for the operation of the expander. In addition, when relative motion is produced between first rod 108 and second rod 110, the compression of sealing ring 112 is varied to adjust the sealing within cylinder 11. The mechanism of achieving this variation will be discussed later.

FIG. 1 also shows cam assembly 42 which operates a pair of levers 44 that are mounted on pivot blocks 45 to operate vertical actuating rods 31. Followers 46 ride on cam 47 to control the motion of the two vertical actuating rods 31. The operating and timing is as follows. The poppet valve 21 controlling inlet chamber 17 is opened to admit a cryogenic fluid at high pressure into cylinder 11 at a time when piston 102 is down. The poppet valve 21 that controls outlet chamber 18 is kept in a closed position at this time. After the high-pressure fluid is admitted into cylinder 11, the poppet valve 21 in inlet chamber 17 is closed. Pressure of the fluid on piston 102 forces piston 102 up, increasing the volume for fluid within cylinder 11 and reducing the pressure through that increase in volume and reducing the temperature through essentially isentropic expansion. While this is happening, the motion of piston 102 converts the potential energy of the pressurized fluid into rotational kinetic energy of the flywheel 41. The timing and volumes are adjusted so that the pressure of the fluid in the cylinder 11 is approximately at the required delivery pressure when the piston 102 is at its maximum upward extension. At this point the poppet valve 21 in outlet chamber 18 is opened and the cooled liquid or gas that is approximately at the delivery pressure is pushed by piston 102 out the outlet line 20 as piston 102 is brought back down by the inertia of the flywheel 41. The motor that is coupled to flywheel 41 thus serves as a speed control and particularly as a brake to remove kinetic energy from the system and to protect the refrigeration system from damage due to excessive speeds. FIGS. 1 and 2 also show a line 113 that is connected to cylinder 11 in a location that samples any fluid or gas that has passed by sealing ring 112. This makes it possible to monitor the blow-by of fluid by measuring the temperature or flow rate of the fluid that has passed sealing ring 12. This information may be used to control the force exerted by sealing ring 112 on cylinder 11, either manually or automatically, in a manner that is described below.

Figure 4:
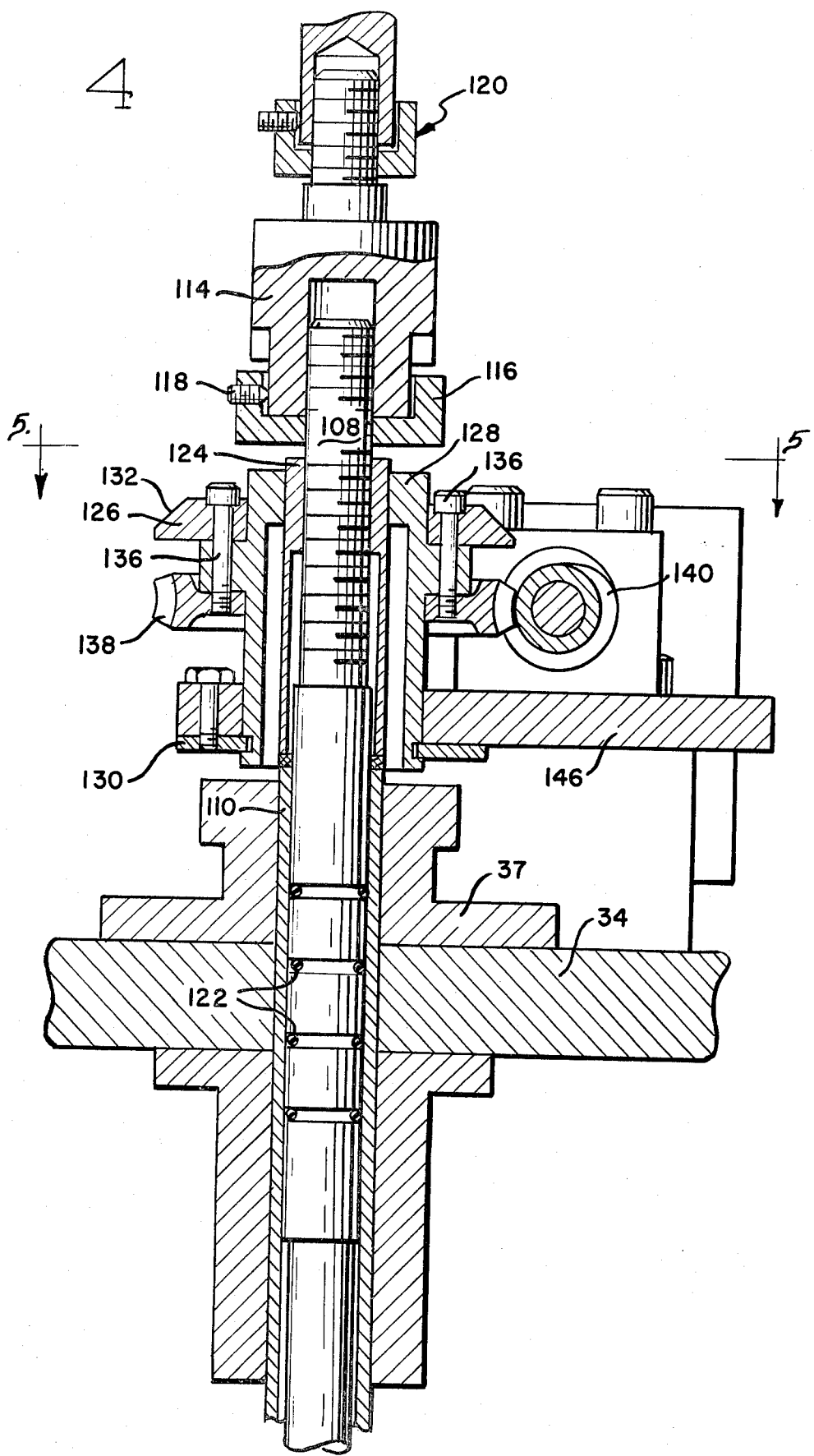
FIG. 4 is a sectional side view of a portion of the shaft and adjusting mechanism of the present invention.
Figure 5:
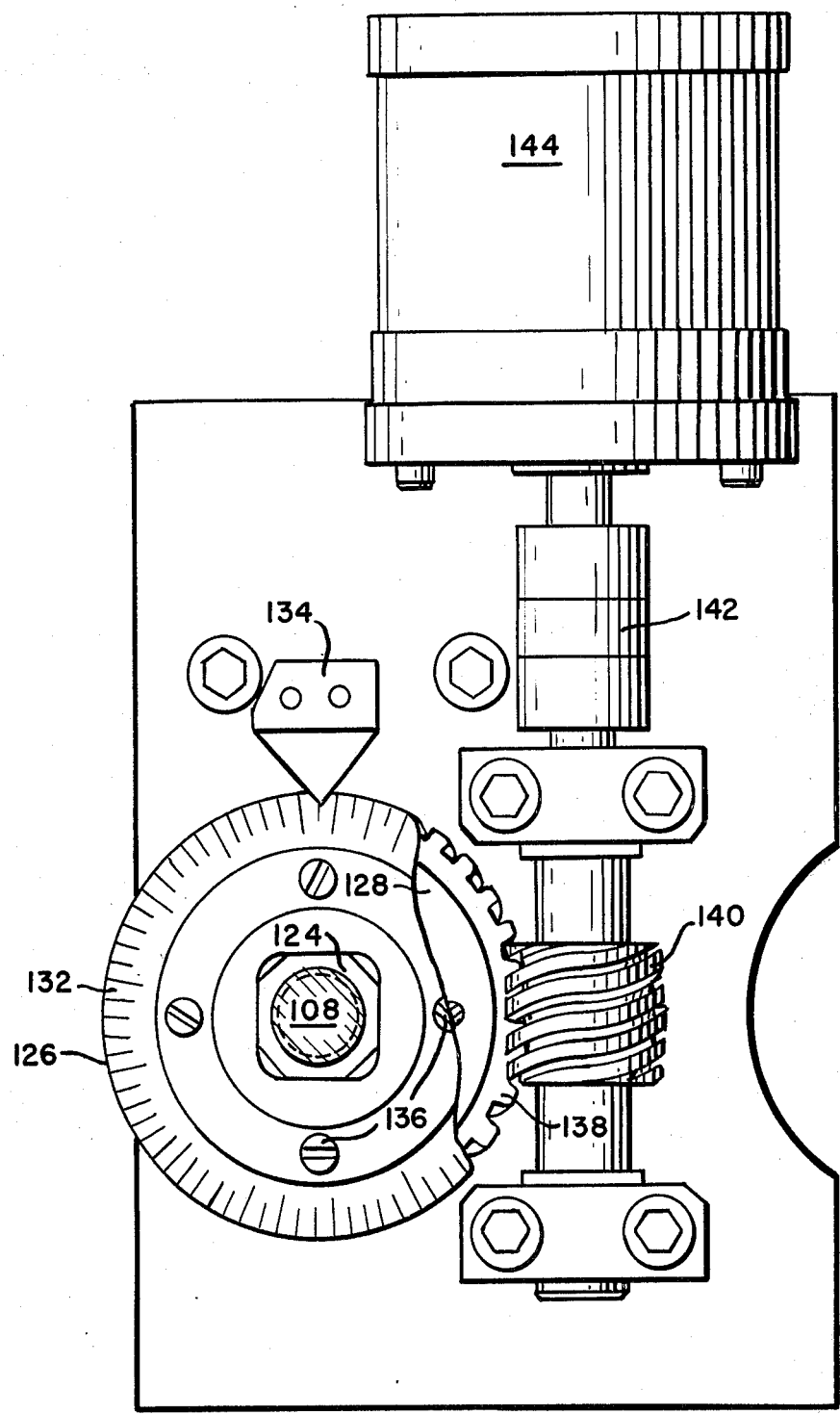
FIG. 5 is a top view of the adjusting mechanism of the present invention.

FIGS. 4 and 5 show a mechanism for varying the relative positions of inner portion 104 and outer portion 106 of piston 102 of FIG. 2 to vary the compression of sealing ring 112. FIG. 4 is a sectional side view of the mechanism for varying the relative position and FIG. 5 is a partial sectional top view of the apparatus of FIG. 4 taken along section lines 5—5. In FIGS. 4 and 5, first rod 108 is shown at its threaded upper end and second rod 110 is also seen at its upper portion. Coupling 114 is attached to the threaded portion of first rod 108 and is held in a desired position thereon by jam nut 116 which, in turn, is secured by set screw 118. Coupling 114 is connected in turn by linkages 120 to flywheel 41 of FIG. 1. Second rod 110 passes through piston rod seal 37 which is mounted on plate 34 of FIG. 1. Piston rod seal 37 prevents the escape of cyrogenic fluid around the outside of second rod 110. Escape of this fluid beteen second rod 110 and first rod 108 is prevented by a plurality of O-rings 122. Second rod 110 is connected to threaded sleeve 124 which is threaded internally to engage the threads on first rod 108 and which has an octagonal external cross section to engage a square slot in index wheel 126. Second rod 110 and threaded sleeve 124 are free to move axially with first rod 108 to follow the gross motion of piston 102. However, rotation of index wheel 126 about the common axis of first rod 108 and second rod 110 causes axial motion of first rod 108 with respect to second rod 110 as a result of the motion of threaded sleeve 124 on the threaded portion of first rod 108. Index wheel 126 includes a sleeve 128 that is supported at one end on the hexagonal cross section of threaded sleeve 124 and at the other by a retaining ring 130. Index wheel 126 also includes index gage 132 which is marked to provide a reference with pointer 134. Index gage 132 is affixed by screws 136 to sleeve 128 and to worm wheel 138. Worm 140 drives worm wheel 138 through a sequence of couplers 142 from motor 144. Plate 146 is mounted to plate 34 to support the aforementioned mechanism for rotating first rod 108 with respect to second rod 110. Motor 144 may be controlled manually to change the setting at pointer 134 or it may be operated in response to a temperature or flow rate signal obtained from escaping gas in line 113 of FIGS. 1 and 2. The possibility of varying the relative positions of first rod 108 with respect to second rod 110 allows the external control of the relative position of inner portion 104 of piston 102 with respect to the outer portion 106. This, in turn, varies the compression of sealing ring 112 to control the sealing of the piston 102 within cylinder 11. The mechanism as shown in FIGS. 4 and 5 is an example of a suitable mechanism to provide automatic control of the piston ring expansion. The piston ring adjustment may be made manually by simply turning threaded sleeve 124 with a wrench.

The embodiments of the invention in which an exclusive property or privilege is claimed are defined as follows:

1. In a reciprocating engine comprising
   a cylinder (11),
   a piston (102) reciprocable in said cylinder consisting of an inner portion (104) and an outer portion (106),
   a sealing ring (112) compressible between the inner portion (104) and the outer portion (106) of the piston (102) against the inner wall of the cylinder (11) and
   means for adjusting the compression on said sealing ring (112) to vary the pressure of the sealing ring against the wall of the cylinder,
   the improvement wherein said means for adjusting the compression is operable while the piston is reciprocating and includes
   a first rod (108) attached to the inner portion (104) and having a threaded upper end,
   a second rod (110), coaxial with the first rod (108), attached to the outer portion (106),
   an internally threaded sleeve (124) attached to the second rod (110) which threadedly engages said threaded upper end,
   an index wheel (126) including a sleeve (128) surrounding threaded sleeve (124) in mating sliding engagement therewith, the mating surface being noncircular in cross section and permitting relative longitudinal movement therebetween and
   means (142) for rotating index wheel (126) whereby relative longitudinal movement of inner portion (104) and outer portion (106) of piston (102) varies the compression of sealing ring (112) against the cylinder wall.

2. The improvement of claim 1 wherein sleeve (128) has a square opening therein and threaded sleeve (124) is octagonal in cross section.

* * * * *